May 9, 1967  F. E. BAUMAN ETAL  3,318,180
GLASS TUBE GAUGING AND CUTTING APPARATUS
Filed Sept. 20, 1965  7 Sheets-Sheet 1

INVENTORS
FRANCIS E. BAUMAN
HARRY J. COSTILL

BY
E.J. Holler &
W.A. Schaich
ATTORNEY

INVENTORS
FRANCIS E. BAUMAN
HARRY J. COSTILL

ATTORNEY

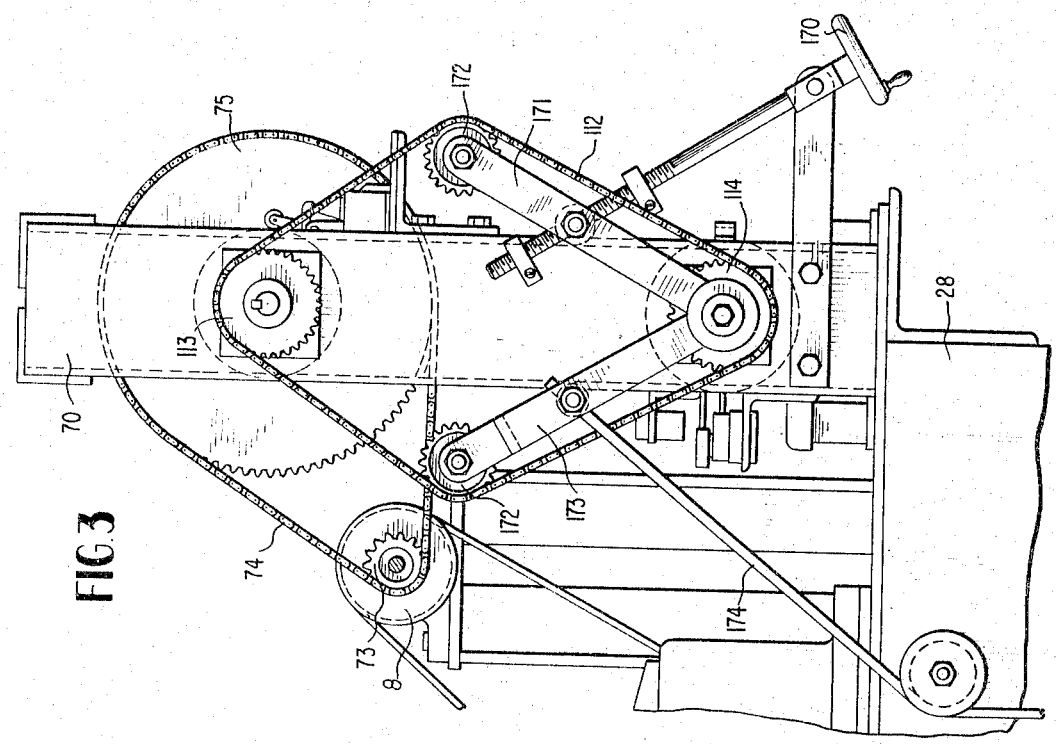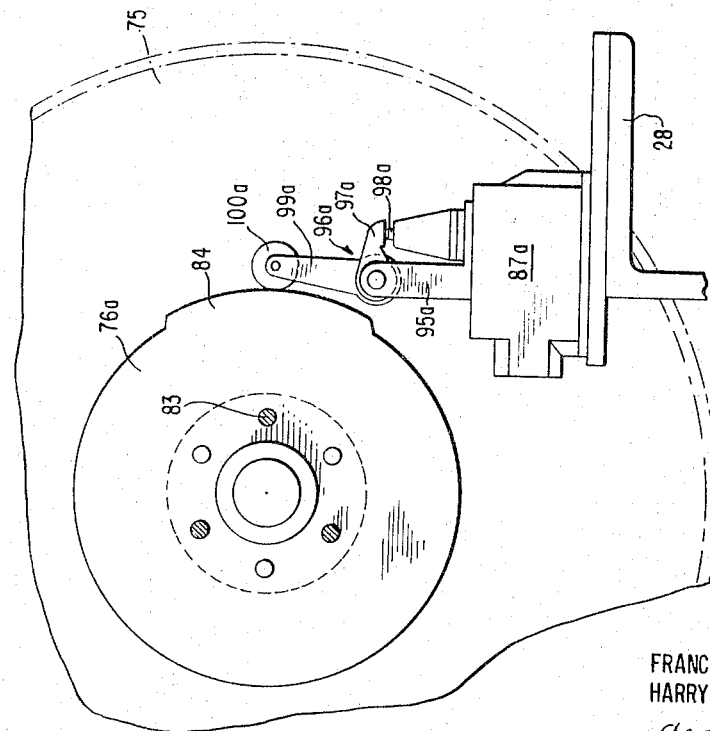

May 9, 1967 F. E. BAUMAN ETAL 3,318,180
GLASS TUBE GAUGING AND CUTTING APPARATUS
Filed Sept. 20, 1965 7 Sheets-Sheet 4

INVENTORS
FRANCIS E. BAUMAN
HARRY J. COSTILL

BY
ATTORNEY

May 9, 1967 F. E. BAUMAN ETAL 3,318,180
GLASS TUBE GAUGING AND CUTTING APPARATUS
Filed Sept. 20, 1965 7 Sheets-Sheet 5

INVENTORS
FRANCIS E. BAUMAN
HARRY J. COSTILL
BY
ATTORNEY

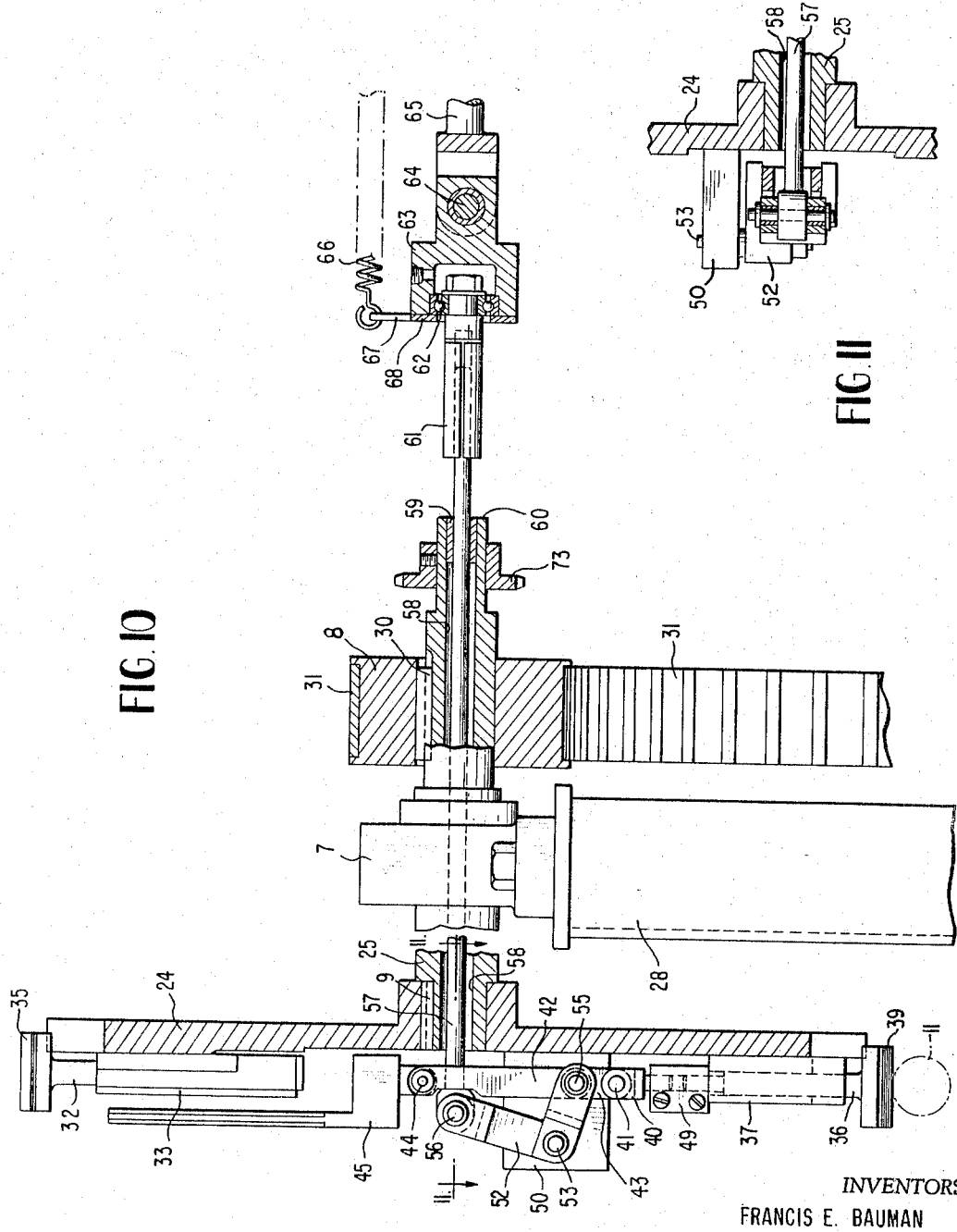

May 9, 1967 F. E. BAUMAN ETAL 3,318,180
GLASS TUBE GAUGING AND CUTTING APPARATUS
Filed Sept. 20, 1965 7 Sheets-Sheet 7

INVENTORS
FRANCIS E. BAUMAN
HARRY J. COSTILL
BY
ATTORNEY

United States Patent Office 3,318,180
Patented May 9, 1967

3,318,180
GLASS TUBE GAUGING AND CUTTING APPARATUS
Francis E. Bauman and Harry J. Costill, Vineland, N.J., assignors to Owens-Illinois, Inc., a corporation of Ohio
Filed Sept. 20, 1965, Ser. No. 488,416
12 Claims. (Cl. 83—287)

This invention relates to an apparatus for severing a continuously drawn glass tube or rod into individual lengths, and more particularly to improved apparatus for cutting a glass tube or rod which is continuously drawn from a pool of molten glass into individual elongated segments having a length dependent upon the outside diameter of the individual segment.

It is known in the art to draw glass tube and solid glass rod, or cane, hereinafter referred to collectively as tube, by continuously drawing the glass from a furnace, tank or other molten supply body, with the glass being shaped into a tube as it leaves the supply body in a plastic condition. The glass tube is drawn horizontally for a considerable distance to permit cooling and hardening and is severed into individual elongated sections, in succession, at the free end of the drawn tube. It is also known to provide a gauging mechanism for continuously gauging the outside diameter of the drawn tube at a point intermediate the glass furnace and the cutting mechanism, and to separate the severed lengths into separate receiving bucks, depending upon whether or not the gauged diameter was within or outside established upper and lower limits. A glass tube gauging and sorting apparatus of this prior art type is illustrated in Dapp et al. Patent No. 2,873,854 assigned to the assignee of the present invention, and the present invention is an improvement on the apparatus shown in this Dapp patent.

The outside diameter of drawn glass tubing frequently must be controlled within very accurate tolerances in order for the end product to be suitable for many purposes. However, as is well known, the outside diameter may be influenced by numerous variable factors so that, in the past, it has been necessary to sort the severed lengths which have an outside diameter falling within the desired limits from those lengths having a diameter falling either above or below the specified diameter. The relatively high rates of draw, ranging up to 500 or more individual segments of up to four feet or more in length per minute, makes continuous sorting very difficult due to the rapid succession of individual lengths moving through the sorting device. Further, the individual lengths frequently leave the cutting mechanism in partially overlapping relation so that a length might be received in the wrong buck even though the sorting mechanisms were properly actuated. Also, it has been found that human error in packaging the cut lengths from the receiving bucks frequently resulted in out-sized tubing being packaged with good tubing. It is, therefore, an object of this invention to provide an improved glass tube cutting apparatus which eliminates the possibility of intermixing good and bad sized tubes.

Another object is to provide an apparatus in which the tube is cut into lengths depending upon the diameter of the individual lengths.

Another object of the invention is to provide an improved gauging and cutting apparatus which cuts the tubing having a diameter falling within prescribed limits into segments having a first length and which cuts tubing having diameter falling outside the prescribed limits into segments having a different length.

In the attainment of the foregoing and other objects, an important feature of our invention resides in providing a cutting device including a first cutting element driven for intermittent engagement with the moving glass tube to sever the tube into elongated segments, with the apparatus being adjustable to sever the rod into segments of any desired length within certain prescribed limits of the apparatus. A gauging device continuously gauges the outside diameter of the glass tube at a point intermediate the furnace and the cutting device, and produces an electrical signal which is variable with variations in the outside diameter of the tube being gauged. A second cutting element is controlled by the variable electrical signal for movement between a retracted position and a cutting position. In the retracted position the second cutting element does not engage the glass tube so that the tube is engaged and cut only by the first cutting element so long as the electrical signal from the gauging device indicates that the diameter of the tube is within prescribed limits. However, when the variable electrical signal indicates the tubing to be outside the prescribed limits, the second cutting element is moved into a cutting position so that the tube is severed alternately by the first and second cutting elements to produce severed segments having a length one half the length of the good segments.

The foregoing and other objects of the invention will become apparent from the following specification taken with the accompanying drawings.

In the drawings:

FIG. 3 is a fragmentary elevational view showing the manually operable adjusting mechanism for the memory device;

FIG. 4 is a fragmentary view taken on line 4—4 of FIG. 2;

FIG. 5 is a fragmentary elevational view taken on line 5—5 of FIG. 2 and showing the reset mechanism of the memory device;

FIG. 6 is a fragmentary sectional view taken on line 6—6 of FIG. 5;

FIG. 7 is a fragmentary sectional view, taken on line 7—7 of FIG. 5, of the memory wheel;

FIG. 10 is a fragmentary sectional view of the tube cutting device;

FIG. 11 is a fragmentary sectional view taken on line 11—11 of FIG. 10;

Figure 1:
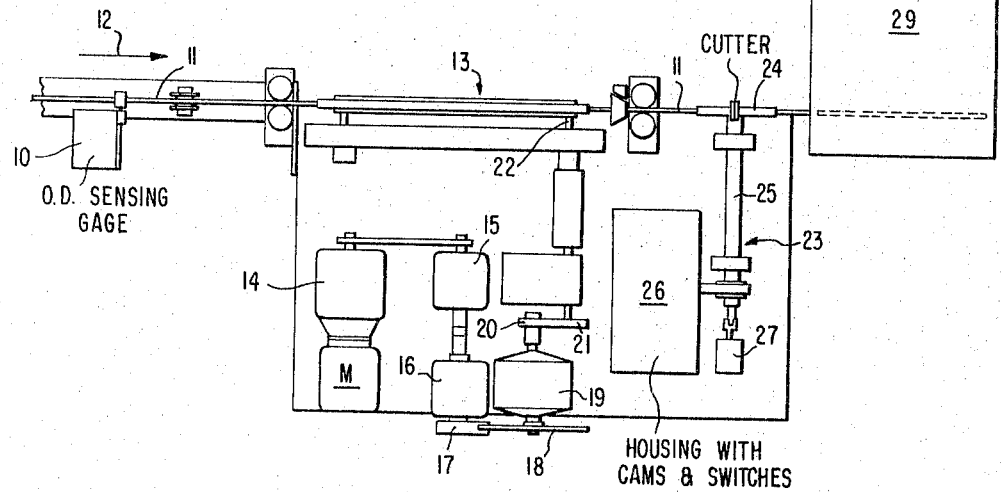
FIG. 1 is a partially diagrammatic view of an apparatus embodying the present invention.

Referring now to the drawings in detail, a tube drawing and cutting apparatus is illustrated schematically in FIG. 1 and comprises, generally, an O.D. sensing gauge 10 for continuously gauging the outside diameter of a glass tube 11, drawn in the direction of arrow 12 from a supply of molten glass, not shown, by a drawing apparatus 13 including a pair of counter-rotating endless belts which engage opposed sides of the glass tube 11 to draw the tube through the apparatus. The opposed endless drawing belts are given by a suitable electric motor M through a series of variable speed transmission gear units 14, 15 and 16, gears 17 and 18, a gear reducer 19, gears 20 and 21 and a drive shaft 22. A tube cutting mechanism is illustrated generally by the reference numeral 23 and comprises a cutter wheel 24 mounted for rotation on a shaft 25 journalled for rotation about an axis perpendicular to and spaced above tube 11 at a point beyond the drawing apparatus 13. The cutting mechanism further includes a memory device 26 which, acting through a solenoid 27 controls the radial position of a movable cutting element on cutter wheel 24. From the cutter mechanism, the cut lengths of tubing pass to a suitable receiving buck 29.

Referring now to FIGS. 10 through 13, the mechanism for severing the glass tube into successive segments will be described in detail. The cutter mechanism 23 includes a cutter wheel 24 mounted, by key 9, for rotation with tubular shaft 25 which, in turn is journalled for rotation about an axis perpendicular to and spaced from the longitudinal axis of the glass tube 11 by suitable bearings 7 supported on frame structure 28. A gear belt pulley 8 is rotatably fixed, as by key 30 to shaft 25 and is rotatably driven by a suitable gear belt 31 which, in turn, is continuously driven through a suitable speed reducer mechanism by motor M at a fixed rate proportional to the rate of the tube drawing apparatus 13. A first cutting element 32 is mounted on the face of cutter wheel 24 by a suitable clamp 33 and bolts 34. Cutting element 32 has a generally rectangular cutting head portion 35 projecting radially outward from the outer periphery of wheel 24 a fixed distance, as required, to permit cutting head 35 to strike the tube 11 upon each rotation of cutting wheel 24. The fixed distance which cutting element 32 projects beyond the periphery of wheel 24 may be adjusted by loosening the clamp 33 to permit the device to accommodate various size tubing.

A second cutting element 36 is slidably mounted on the face of wheel 24 at a position 180 degrees from cutting element 32 by a guide bracket 37 mounted, as by bolts 38, on wheel 24. Cutting element 36 is movable radially of wheel 24 between a cutting position, illustrated in FIG. 12, in which the generally rectangular cutting head 39 projects radially from the periphery of wheel 24 at a distance corresponding to the radial position of cutting head 35 of element 32 and a retracted position, illustrated in FIG. 13, in which cutting head 35 does not project from the periphery of cutting wheel 24 at a distance sufficient to engage a tube 11 upon rotation of the cutting wheel 24.

The second cutting element 36 is supported for radial sliding movement through guide block 37 by a yoke 40 fixedly secured, through a split clamp ring 49, to its radially inner end. Yoke 40 is pivotally connected, as by pin 41, to one end of a link 43 having its other end connected to a pin 55. Also connected to the pin 55 is one end of an elongated link 42 having its other end pivotally connected to a counterweight 45 extending outwardly from the center of rotation of wheel 24 in the direction of cutting element 32. Counterweight 45 is guided for radial movement with movable cutting element 36 and link 42 by a plurality of guide rollers 46 rotatably supported on adjustable brackets 47 mounted, as by screws 48 to the face of cutting wheel 24. The split ring clamp 49 joining cutting element 36 and yoke 40 is positioned to engage mounting block 37 to positively limit the outward movement of cutting element 36.

A bearing block 50 is rigidly fixed, as by mounting screws 51, on wheel 24 and a crank arm 52 is mounted on block 50, as by shaft 53 for limited pivotal movement about an axis perpendicular to the longitudinal axis of tubular shaft 25 and radially spaced therefrom in the general direction of cutting element 36. Crank 52 has one arm pivotally mounted by pin 55 to link 42 and link 43. The other arm of crank 52 is pivotally connected, as by pin 56, to an elongated actuating rod 57 disposed within and extending through the hollow central bore 58 of shaft 25. Rod 57 is slidably supported for coaxial movement within bore 58 by a suitable bushing 59.

Figure 13:
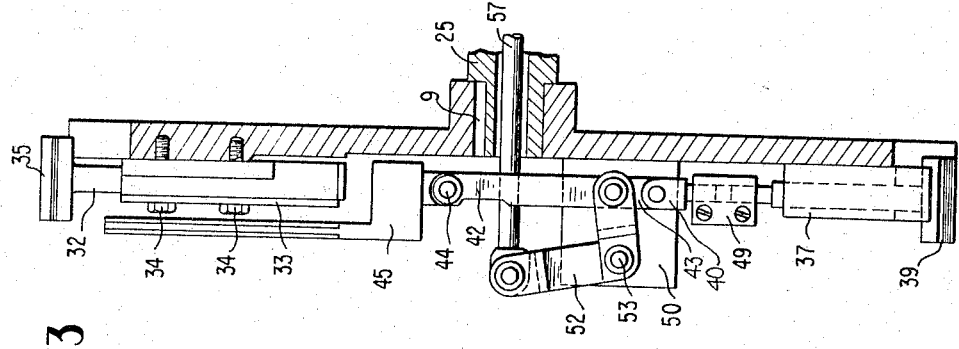
FIG. 13 is a fragmentary sectional view of a portion of the mechanism shown in FIG. 10 with certain parts shown in an alternate position; and, FIG. 14 is a wiring diagram.
Figure 12:
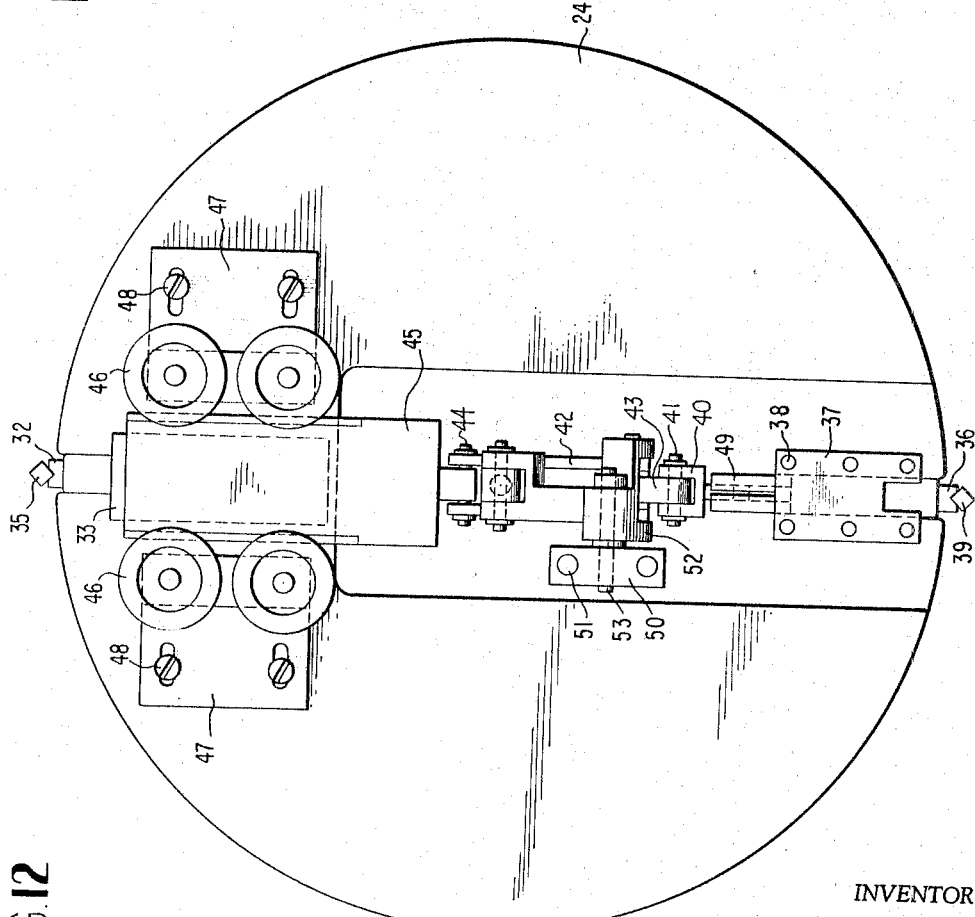
FIG. 12 is an elevational view of the cutting device shown in FIG. 10.

Shaft 57 projects outwardly beyond the end 60 of shaft 25 and is rotatably connected, through a thrust sleeve 61, a thrust bearing 62, a yoke 63 and a pivot pin 64 to the movable armature 65 of solenoid 27. A coil tension spring 66, acting through an upstanding tab 67 on bearing retainer ring 68 resiliently urges the solenoid armature 65, and the rod 57 connected thereto, in a direction tending to retract rod 57 from within the hollow bore 58 to thereby rotate crank 52 in a direction projecting cutting element 36 outwardly into the cutting position illustrated in FIG. 10 of the drawings. When energized, solenoid 27 overcomes the tensile force of spring 66 to project rod 57 outwardly from the face of cutting wheel 24 to thereby rotate crank 52 in a direction to retract movable cutting arm 36 from the cutting position, as illustrated in FIG. 13. Thus, when solenoid 27 is energized, tube 11 will be engaged and cut only by the cutting head 35 of cutting element 32; however, when solenoid 27 is de-energized, tube 11 will be alternately cut by cutting heads 35 and 39 to sever the tube into segments having a length equal to one-half the length of the segments severed when only cutting element 35 engages tube 11.

In order to assure that the second cutting element is moved into the cutting position in time to sever any segment having any portion of its diameter outside prescribed limits, the O.D. sensing gauge 10 is spaced from the cutter 23 a distance at least equal to the length of the longest segment of tube to be severed by the apparatus. The O.D. sensing gauge produces an electrical signal, in a manner well known in the art, which signal varies in accordance with variations in the outside diameter of the tube 11. When the diameter of the drawn tube is either above or below the acceptable limits, a signal is transmitted from the O.D. sensing gauge to memory device 26 which controls cutter 23, through solenoid 27, to cut in half any length of tubing having the unacceptable variation in diameter.

Referring particularly to FIGS. 2 through 9 of the drawings, the memory device 26 includes a suitable frame 70 supporting an upper horizontal shaft 71 for rotation about an axis parallel to tubular shaft 25, as by journals 72. A sprocket 73 is rotatably fixed (FIG. 10) on shaft 25 and a chain 74, extends around sprocket 73 and a sprocket 75, having a circumference equal to six times the circumference of sprocket 73 and rotatably fixed on shaft 71 to drive shaft 71 at a constant rate equal to one sixth the rate of cutter wheel 24. Six identical circular cams 76a, 76b, 76c, 76d, 76e, 76f are rotatably fixed on shaft 71 and are maintained in axially spaced relation therealong by a plurality of spacing spools 82 secured to shaft 71 for rotation therewith by any suitable means. The circular cams are rigidly fixed by bolts 83 extending axially through the assembled cams and spacer spools. The respective circular cams 76a–76f are identical in construction and are formed with a raised portion 84 extending slightly less than 60 degrees around its outer periphery, with the respective raised portions 84 being offset circumferentially with espect to one another to collectively provide a raised surface slightly less than 360 degrees around shaft 71.

A support bracket 85 is rigidly mounted on frame 70, as by bolts 86, and extends along shaft 71 in spaced relation to cams 76a–76f. Six similar limit switches 87a–87f are mounted in fixed position on bracket 85 one adjacent each circular cam 76a–76f, in position to be actuated by the raised portion 84 upon each revolution of the respective cams. Referring to FIG. 4 it is seen that the respective limit switches 87a–87f include similar mounting and actuating mechanisms, only one of which will be described, it being understood that the remaining switches have similar elements associated therewith. Switch 87a includes a bracket 95a which pivotally supports a crank 96a. Crank 96a includes a first arm 97a engaging a conventional switch actuator 98a, and a second arm 99a carrying a rotating cam follower 100a in engagement with the external surface of the associated circular cam. Actuator 98a is resiliently biased in a direction to maintain cam follower 100a in contact with the circular cam, with the switch being actuated upon movement of the cam follower 100a between the circular peripheral surface of the respective cam and the raised portion 84 thereof.

The raised portions 84 of the respective cylindrical cams are circumferentially offset with respect to one another and extend slightly less than 60 degrees around the periphery of its associated circular cam to prove a slight break in the circuitry between each successive length of tube. This break is necessary to insure that any given signal is associated only with the tube length from which it was taken and not from the end portion of one of the adjacent tube lengths.

A second shaft 110 is mounted for rotation in frame 70, as by bearings 111, about an axis parallel to and spaced below shaft 71. Shaft 110 is rotatably driven by a chain 112 extending over a sprocket 113 rotatably fixed on shaft 71 and a sprocket 114 rotatably fixed on shaft 110. Six memory wheels, 120a–120f, are rotatably fixed to shaft 110, at spaced intervals therealong, for rotation therewith. The separate memory wheels are identical in construction and function, and differ only in that successive wheels are rotatably offset 60 degrees with respect to one another in a manner similar to the respective circular cams 76a–76f. Accordingly, only memory wheel 120a and the mechanism associated therewith will be described in detail, it being understood that the description applies similarly to each of the respective memory wheels and there associated mechanisms. Further, where duplicate parts are associated with the respective memory wheels, these parts will be assigned a reference numeral followed by a letter a, it being understood that similar parts are associated with memory wheels 120b–f.

Referring to FIGS. 5–7, it is seen that wheel 120a is rotatably fixed on shaft 110 by a key 121a. A contact actuating pin 122a is slidably received within an axial bore 123a extending through wheel 120a adjacent the outer periphery thereof. A radially reduced section or detent 125a is formed on pin 122a, and a ball 126a disposed within a radially extending bore 127a, is resiliently urged into contact with pin 122a by a spring 128a to urge pin 122a into frictional contact with the side wall of bore 123a and thereby apply limited resistance to axial movement of pin 122a within bore 123a. Ball 126a is adapted to project into detent 125a to releasibly retain the pin 122a upon axial movement of the pin to position detent 125a in alignment with bore 127a.

A first elongated support bar 130 is rigidly supported on frame 70 and extends parallel to memory shaft 110. A solenoid 131a is mounted on the underside of bar 130, as by bolts 132a, in spaced relation to wheel 120a. A second elongated support bar 133 is mounted on frame 70 and extends parallel to and spaced beneath bar 130. Bar 133 supports an elongated arm 134a for pivotal movement about a vertical pin 135a. A coil tension spring 136a has one end fixed to mounting bar 133 as by screw 137a and its other end attached to support arm 134a to resiliently urge arm 134a for rotation about pin 135a. Solenoid 131a is operatively connected to arm 134a to limit rotation of the arm about pin 135a. Arm 134a extends into overlying relation with and supports an elongated cam element 140a in spaced relation to one side face of memory wheel 120a and spring 136a urges 134a in a direction to move cam 140a away from wheel 120a. Solenoid 131 is operable, when energized, to overcome the tension in spring 136a to move cam 140a to a position spaced closely adjacent the side face of wheel 120a in position to engage and move pin 122a through bore 123a to bring detent 125a into engagement with ball 126a. This position of pin 122a, with detent 125a in engagement with ball 126a, will be referred to hereinafter as the disengage position, while the position with detent 125a spaced axially from ball 126a will be referred to as the neutral position.

Bar 133 supports a second arm 141a for pivotal movement about a vertical pin 142a spaced from pin 135a. Arm 141a supports an elongated cam element 144a adjacent the side face of memory wheel 120a opposite cam 140a. A coil tension spring 145a resiliently urges arm 141a in a direction to move cam 144a toward memory wheel 120a. A limit switch 146a is mounted on bar 133 adjacent arm 141a, and has an actuating lever 147a extending outwardly therefrom in position to be actuated by cam 144a upon movement of cam 144a toward or away from memory wheel 120a. Cam 144a is normally maintained in position closely adjacent the side face of memory wheel 120a, by the action of spring 145a, in position to be engaged by pin 122a when pin 122a is in the disengage position. With pin 122a in the disengage position, cam 144a will be pivoted about support pin 142a against the force of spring 145a by pin 122a, which is releasibly retained against sliding movement in bore 123a by the ball 126a disposed within detent 125a. Movement of cam 144a by pin 122a causes movement of actuating arm 147a to actuate limit switch 146a for so long as pin 122a is in engagement with cam 144a. Cam 144a extends along wheel 120a a distance slightly greater than 60 degrees for a purpose to be more fully explained hereinbelow.

A pair of normally open microswitches 150a, 151a are mounted in side-by-side relation on a bracket 152a fixed on frame 70. Switch 150a has an elongated actuating arm 153a extending along the side face of wheel 120a, on the same side thereof as cam 144a, in position to be actuated by pin 122a in the disengage position. Switch 151a has an elongated actuating arm 154a extending along the side face of memory wheel 120a, opposite actuating arm 153a, in position to be engaged and actuated by pin 122a in the neutral position shown in FIG. 7.

A fixed cam 160a is supported in position adjacent the side face of memory wheel 120a, by a bracket 161a on frame 70, with cam 160a being positioned to engage and move 122a axially within bore 123a from the disengage position to the neutral position shown in FIG. 7.

A microswitch 165a is mounted on a bracket 166a adjacent bracket 161a and has an actuating arm 167a extending adjacent one side face of wheel 120a in position to be engaged and deflected by pin 122a to thereby actuate microswitch 165a upon each revolution of memory wheel 120a.

Figure 2:
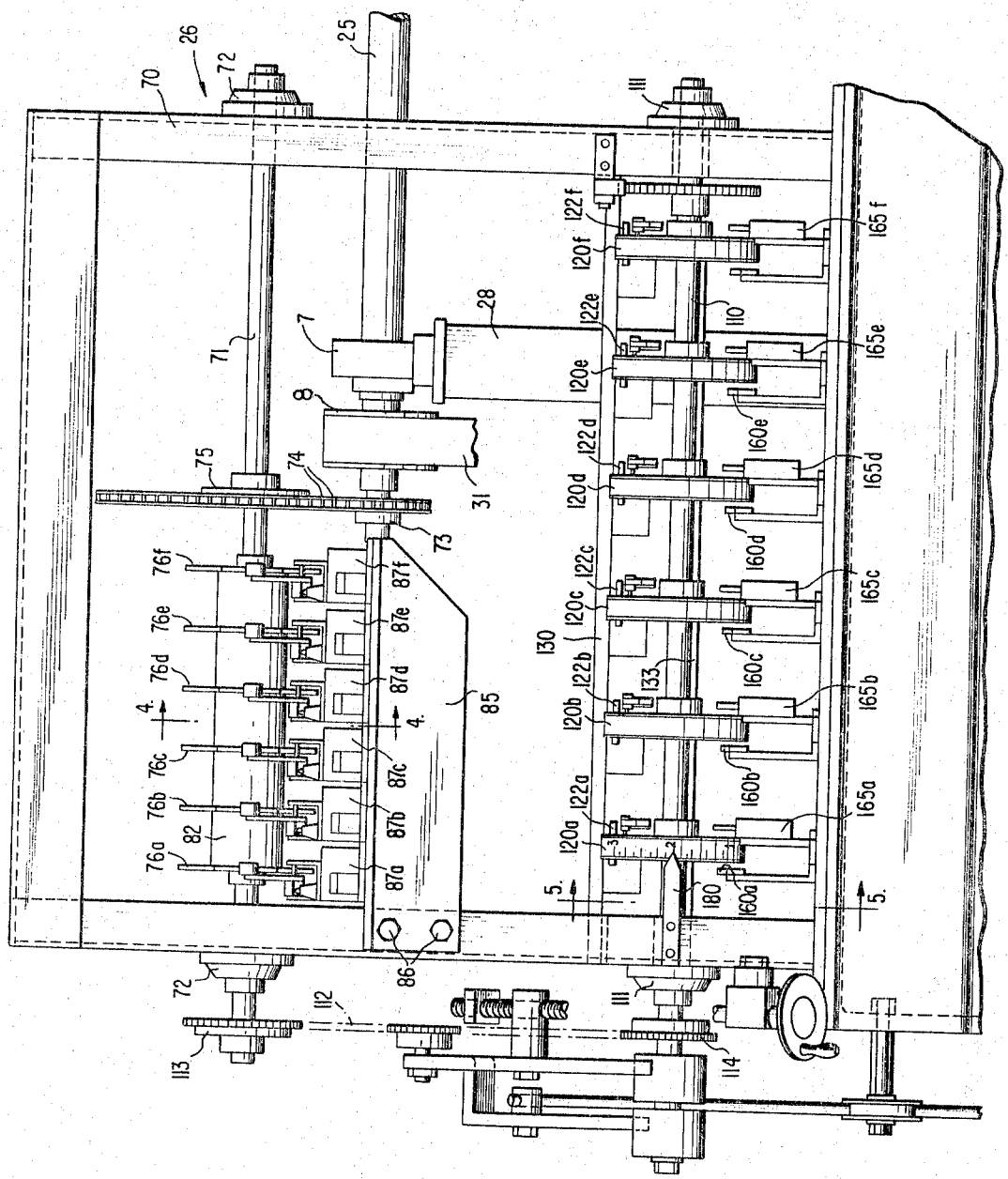
FIG. 2 is a fragmentary elevational view showing the memory device and associated parts employed with the cutting device.
Figure 8:
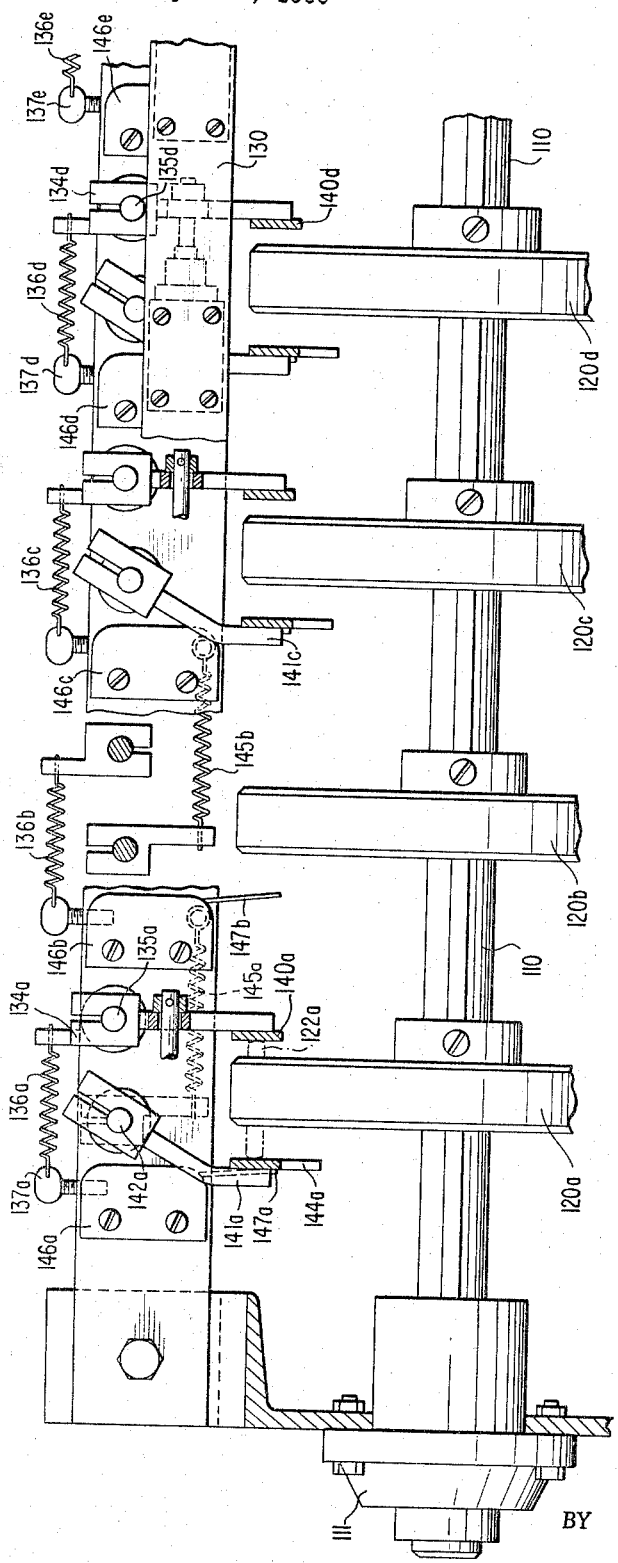
FIG. 8 is a fragmentary sectional plan view taken on line 8—8 of FIG. 5, and showing a portion of the memory device.
Figure 9:
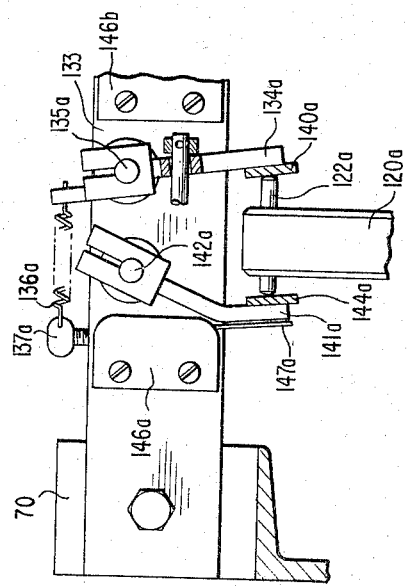
FIG. 9 is a fragmentary view of a portion of the mechanism shown in FIG. 8 with certain parts shown in alternate positions.

Referring to FIG. 2, it is seen sprockets 113 and 114 are of the same diameter so that the memory shaft 110 is driven at the same speed as shaft 71 which, in turn, is continuously driven at a rate proportional to the rate of cutter wheel 24. However, the relative rotative position of the two shafts may be adjusted by turning hand wheel 170 to thereby cause pivotal movement of arm 171 about memory shaft 110. Movement of arm 171 causes movement of idler sprocket 172 to vary the length of the drive chain extending between sprockets 113 and 114 over idler sprocket 172 to thereby cause relative movement between shafts 71 and 110. A second idler sprocket 172 mounted for rotation on the end of an arm 173 which, in turn, is pivotally mounted for rotation about the longitudinal axis of shaft 110. Arm 173 is urged for rotation in a direction to maintain sprocket 172 in engagement with chain 112 by a suitable weight, not shown, secured to a flexible strand 174 having one end secured to the arm 173.

An indicator arm 180 is fixed on frame 70 and extends horizontally therefrom to terminate in a point adjacent the outer periphery of memory wheel 120a. A linear scale is marked upon the circumference of wheel 120a, with th scale ranging from 1 to 3 and broken itno appropriate subdivisions between the major divisions. By properly positioning shaft 71 so that the cam 76a has just actuated switch 87a, the indicator arm 180 will point to a number of the scale marked on wheel 120a which will be an indication of the relative rotative positions of shafts 71 and 110.

The linear scale on memory wheel 120a is calibrated to accurately indicate the ratio of the distance between the sensing gauge 10 and the cutter 23 to the length of the individual segment of good tubing to be cut from the continuously drawn tube. For example, assuming a distance of 96 inches from the center line of the tube cutter 23 to the sensing gauge 10, and assuming further that a length of 54 inches is desired for the cut length of good tubing, the ratio of the distance between the gauge and the cutter of the length of the cut will be 1.78. By adjusting the hand wheel 170 so that the indicator 180 points to 1.78 on the calibrated scale, while maintaining the cutter element 32 in the cutting position engaging a tube 11 and cam 76a in position ready to actuate microswitch 87a, shaft 110 will be rotated relative to shaft 71 a distance to delay movement of pin 122 into contact with cam 144a by a time equal to the time required for 1.78 lengths of tubing to travel from the gauging mechanism to the tube cutter.

It is apparent that, for any fixed distance between the sensing gauge and the cutter, the timing mechanism may be adjusted to cut any desired length of tubing, merely by adjusting the cutter drive mechanism to cut the desired length and setting the memory device, as described above, with the indicator arm 180 pointing to the number on the scale corresponding to the ratio of the fixed distance and to the length of tubing being cut. Further, for a fixed length of tubing, the sensing gauge may be moved longitudinally along the length of tubing, with the adjustment of the memory device being the same as described above.

Figure 14:
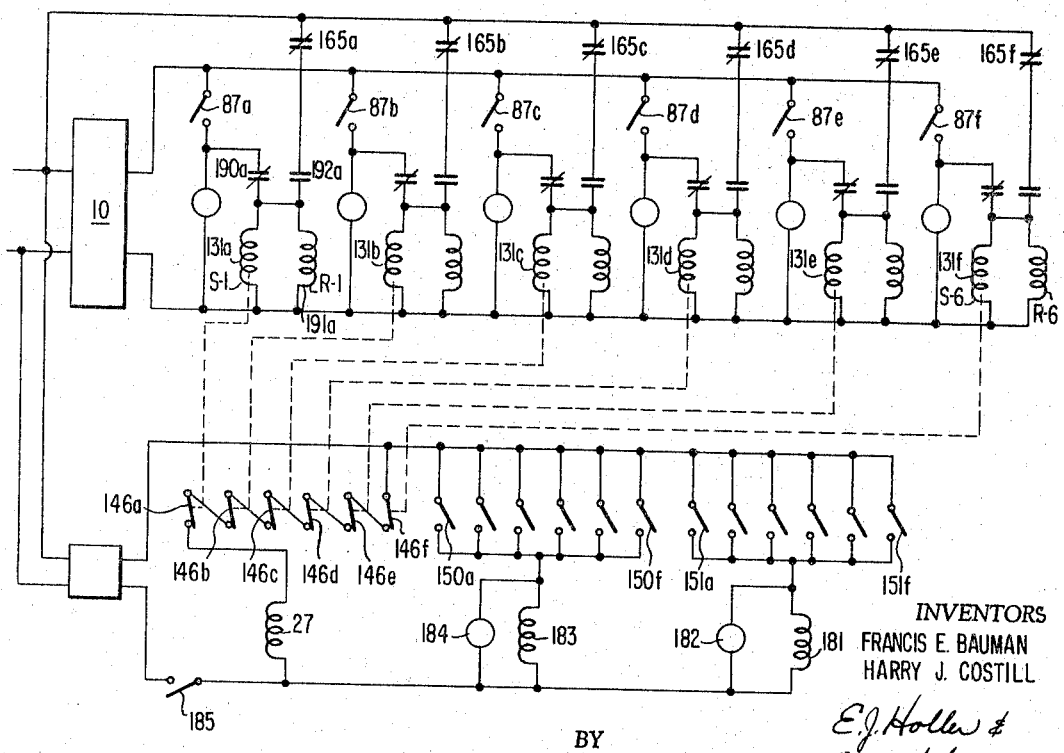

Referring now to the wiring diagram shown in FIG. 14, the operation of the tube gauging and cutting apparatus will be described in detail. With the apparatus in operation so that cutter wheel 24 and shafts 71 and 110 are driven at a constant rate, electric current is supplied from any suitable source to the memory mechanism 26 through the O.D. sensing gauge 10 and to the cutter control circuit through a manually operable control switch 185. So long as the outside diameter of the glass tube 11 passing through gauge 10 is within the prescribed limits, no electrical signal is produced by sensing gauge 10 and, therefore, no signal is transmitted to the memory mechanism. The absence of a signal from the gauge 10 results in continuous de-energization of solenoid 131a so that cam 140a is maintained in a spaced relation to the face of memory wheel 120a by spring 136a, and pin 122a will be permitted to move, upon rotation of shafts 71 and 110, past cam 140a without being moved to the displaced position. Continued rotation of shaft 110 and memory wheel 120a will move pin 122a past cam 144a without displacing the cam to actuate switch 146a so that its normally closed contacts remain closed. The closed contacts of switch 146a provide a closed circuit to energize solenoid 27 and thereby maintain cutting element 36 in the retracted position so that, upon rotation of cutting wheel 24, tube 11 will be engaged and cut only by cutting element 32.

Further rotation of memory wheel 120a with pin 122a in the neutral position will cause pin 122a to engage actuator 154a to momentarily close the normally open contacts of limit switch 151a. Switch 151a completes a circuit through a counter 181 which counts the good length of tubing being severed, and to a signal lamp 182 which flashes a visual signal indicating that a good length of tubing has been severed.

When the outside diameter of tube 11, passing through gauge 10, is either above or below prescribed limits, an electrical signal will be transmitted by gauge 10 to the memory device 26. Upon rotation of cam 76a into position to bring enlarged portion 84a into engagement with cam follower 100a, limit switch 87a will be actuated to close its normally open contacts in circuit with the normally closed contacts 190a of a holding relay 191a to energize solenoid 131a. Energizing solenoid 131a closes the normally closed contacts 192a in circuit with the normally closed contacts of switch 165a to provide a second closed circuit to solenoid 131a. While one of the switches 87a–87f will be closed upon each revolution of the shaft 25, the solenoid 131a will be energized only when a signal has been produced by the gauge 10 to establish a circuit through the normally-closed contact of the holding relays.

Energization of solenoid 131a shifts cam 140a into position to engage and shift pin 122a to the disengage position upon rotation of the memory wheel to move the pin 122a past cam 140a. Further rotation of wheel 120a brings pin 122a into contact with cam 144a to pivot arm 141a about pin 142a to thereby deflect actuator arm 147a and actuate limit switch 146a to open its normally closed contact points. Opening the normally closed contact points of switch 146a interrupts the electrical circuit to solenoid 27, thereby permitting coil tension spring 66 to shift rod 57 within hollow shaft 25 to thereby rotate crank 52 and project cutting element 36 radially outward in position to engage and sever tube 11 upon rotation of cutter wheel 24.

As shaft 71 continues to rotate, raised portion 84a of cam 76a will move past cam follower 100a thereby permitting the normally open contacts of limit switch 87a to open the circuit through switch 87a and contact 190a of relay 191a to solenoid 131a. However, solenoid 131a remains energized through the normally closed contact of switch 165a and the contacts 192a of relay 191a.

Continued rotation of shaft 71 and shaft 110 will bring pin 122a into engagement with actuating arm 153a of limit switch 150a to momentarily close the normally open contacts of limit switch 150a. Closing the normally open contacts of limit switch 150a completes a circuit through a counter mechanism 183 and a signal lamp 184 to count an outsized length of tube and provide a visual signal indicating that an outsize segment has been severed. Further rotation of shaft 110 will bring pin 122a into engagement with cam 160a to force pin 122a axially within bore 123a from the disengage to the neutral position. Further rotation of memory wheel 120a brings pin 122a into engagement with arm 167a to actuate limit switch 165a to momentarily open its normally closed contacts and thereby interrupt the circuit, through contacts 192a of relay 191a, to solenoid 131a. Since switch 87a has been opened, solenoid 131a will be de-energized, thereby permitting spring 136a to shift arm 134a about pin 135a to move cam 140a in a direction away from memory wheel 120a.

Since shaft 25 is driven at a rate equal to six times the rate of shaft 71, due to the difference in diameter of sprockets 73 and 75, it is apparent that cutting element 32 will engage and cut tube 11 six times for each revolution of the respective shafts 71 and 110. However, with cams 76a–76f offset sixty degrees circumferentially with respect to one another on shaft 71, and with memory wheels 120a–120f offset sixty degrees with respect to one another on shaft 110, and with the electrical circuits actuated by these cams 76a–76f and memory wheels 120a–120f being connected in parallel, the auxiliary cutter 36 may be projected or retracted during any particular revolution of cutter wheel 24 in accordance with the gauged diameter of the particular length of tubing being cut. However, to prevent repeatedly energizing and de-energizing solenoid 27 when successive outsized segments are being cut, the cams 144a extend slightly more than 60° around wheel 120a to thereby maintain the switch 146a open slightly after the next successive switch is opened.

While we have described a preferred embodiment of our invention we wish it understood that we do not intend to be restricted solely thereto but that we do intend to include all embodiments thereof apparent to one skilled in the art and which come within the spirit and scope of our invention.

What is claimed is:

1. In an apparatus for continuously drawing a glass tube in a horizontal direction including a gauging mechanism for continuously gauging the diameter of the tube, said gauging mechansm producing an electrical signal variable with variations in the diameter of the tube, and a cutting device for severing the continuous tube into elongated segments, said cutting device comprising a first cutting means driven for intermittent engagement with the continuously moving tube to sever the tube at spaced points along the length thereof, selectively operable second cutting means for engaging and severing the continuously moving tube at points intermediate said spaced points, and means responsive to the electrical signal produced by said gauging mechanism for operating said second cutting means, said first and second cutting means cooperating to sever the tube into segments having a length in accordance with the gauged diameter of the individual segment.

2. In an apparatus for continuously drawing a glass tube in a horizontal direction including a gauging mechanism for continuously gauging the diameter of the tube, said gauging mechanism producing an electrical signal variable with variations in the diameter of the tube, and a cutting device for severing the continuous tube into elongated segments, said cutting device comprising first cutting means driven for intermittent engagement with the continuously moving tube to sever the tube at spaced points along the length thereof, and selectively operable second cutting means for intermittently engaging and severing the continuously moving tube at points intermediate said spaced points, said selectively operable means being responsive to the variable electrical signal produced by said gauging mechanism to sever the tube into segments having a length in accordance with the gauged diameter of the individual segment.

3. In an apparatus for continuously drawing a glass tube in a horizontal direction including a gauging mechanism for continuously gauging the diameter of the tube, said gauging mechanism producing an electrical signal variable with variations in the diameter of the tube, and a cutting device spaced from said gauging mechanism in the direction of movement of the tube for severing the continuous tube into elongated segments, said cutting device comprising a first cutting element driven for intermittent engagement with the continously moving tube to sever the tube at spaced points along the length thereof, selectively operable second cutting means movable between a retracted position and a cutting position for selectively engaging the continuously moving tube at points intermediate said spaced points, said selectively operable means being responsive to the variable electrical signal produced by said gauging mechanism to sever the tube into segments having a length in accordance with the gauged diameter of the individual segment, and a memory device operably connected to said second cutting means to delay movement of said second cutting means from said retracted position to said cutting position.

4. An apparatus for continuously drawing a glass tube in the direction of its length, including a gauging mechanism for continuously gauging the diameter of the tube, said gauging mechanism producing an electrical signal variable with variations in the diameter of the tube, and a cutting device for cutting the tube into elongated segments, said cutting device comprising first cutting means mounted for movement into engagement with the tube, means moving said cutting element into intermittent engagement with the tube to sever the tube into segments having a first predetermined length, second cutting means mounted for movement between a cutting position and a retracted position, means responsive to the electrical signal produced by said gauging mechanism to selectively move said second cutting element between said retracted and cutting positions, means driving said second cutting means into intermittent engagement with said tube alternately with said first cutting means when said second cutting element is in said cutting position to sever the tube into segments having a length shorter than said pre-determined length.

5. The apparatus defined in claim 4 wherein said selectively operable means is responsive to said variable electrical signal to move said second cutting element between said retracted and cutting positions to sever the rod into segments having a length in accordance with the gauged diameter of the individual segment.

6. The apparatus defined in claim 5 wherein said first and second cutting means are mounted for rotation about axes spaced from the longitudinal axis of the tube in position for said first cutting means to engage the tube upon each revolution about its axis, and said second cutting means is movable between a cutting position engaging the tube upon rotation about its axis and a retracted position not engaging the tube upon rotation about its axis.

7. The apparatus as defined in claim 5 wherein said first and second cutting means are mounted for rotation about a common axis substantially perpendicular to and spaced from the longitudinal axis of the glass rod, said first cutting means being supported at a fixed radial distance from said axis, and said second cutting means being mounted for radial movement with respect to said axis between a cutting position and a retracted position.

8. The apparatus defined in claim 5 wherein said selectively operable means includes electromagnetic means responsive to said variable electrical signal for moving said second cutting means between said retracted and said cutting position.

9. The apparatus defined in claim 8 wherein said cutting device is spaced from said gauging mechanism in the direction of movement of the tube, and wherein said selective operable means includes a memory device delaying movement of said second cutting means from said retracted position to said cutting position.

10. In an apparatus for continuously drawing a glass tube in a horizontal direction including a gauging mechanism for continuously gauging the diameter of a tube, said gauging mechanism producing an electrical signal when the diameter of the tube falls outside prescribed limits, a cutting device intermittently engaging and severing the continuous tube into segments each having a length determined by the gauged diameter thereof, a memory device operatively connecting said gauging mechanism and said cutting device, said memory device comprising a memory wheel mounted for rotation about its axis, means driving said memory wheel for rotation at a rate proportional to the rate of movement of the glass tube, an actuator pin mounted on said wheel for rotation therewith, said pin being movable axially of said wheel between a disengage position and a neutral position, electromagnetic means including a solenoid and its armature mounted adjacent the path of rotation of said pin, means responsive to a signal produced by said gauging mechanism operable to move said armature into position to engage and move said pin from said neutral to said disengage position upon rotation of said memory wheel to move said pin past said armature, means actuable by said pin upon continued rotation of said wheel with said pin in said disengage position for varying the length of segments severed by the cutting device, and means for engaging said returning said pin to said neutral position prior to said pin making a complete revolution about said wheel axis.

11. In an apparatus for continuously drawing a glass tube in a horizontal direction including a gauging mechanism for continuously gauging the diameter of a tube, said gauging mechanism producing an electrical signal when the diameter of the tube falls outside prescribed limits, a rotatable cutting device, means driving said cutting device for intermittently engaging and severing the continuous tube into segments each having a length determined by the gauged diameter thereof, a memory device operatively connecting said gauging mechanism and said cutting device, comprising a plurality of memory wheels mounted for rotation about a common axis, means driving said memory wheels for rotation about said axis simultaneously at a rate proportional to the rate of said cutting device, an actuating pin mounted on each said memory wheel for rotation therewith, each said pin being movable axially of its associated memory wheel between a disengage position and a neutral position, said memory wheels being angularly displaced with respect to one another to position the respective pins at equal angular intervals around said shaft, electromagnetic means including a solenoid and its armature mounted adjacent the path of rotation of each said pin, means responsive to a signal produced by said gauging mechanism operable to move one of said armatures in succession into position to engage and move the adjacent pin from said neutral to said disengage position upon each complete revolution of said cutting device, means actuable by the pin in said disengage position upon continued rotation of the pin for varying the length of segments severed by the cutting device, and means for engaging and returning said pin to said neutral position prior to said pin making a complete revolution.

12. The invention defined in claim 11 wherein said means operable to move said armature includes a cam shaft, a plurality of cams mounted for rotation thereon at a rate equal to the rate of rotation of said memory wheels, the number of cams corresponding to the number of said memory wheels, means electrically connecting said gauging mechanism to said electro-magnetic means and including a switch operable by each said cam to complete an electrical circuit energizing one of said electro-magnetic means.

References Cited by the Examiner
UNITED STATES PATENTS

| | | | |
|---|---|---|---|
| 1,965,523 | 7/1934 | Macfarren | 83—305 |
| 2,343,887 | 3/1944 | Crane et al. | 83—371 X |
| 2,693,233 | 11/1954 | Seidman | 83—371 |
| 2,873,854 | 2/1959 | Dapp et al. | 209—88 |

ANDREW R. JUHASZ, *Primary Examiner.*